United States Patent
Fukase

(10) Patent No.: US 9,900,474 B2
(45) Date of Patent: Feb. 20, 2018

(54) COLOR PROCESSING APPARATUS, INSPECTION APPARATUS, AND COLOR PROCESSING METHOD

(71) Applicant: Takahiro Fukase, Kanagawa (JP)

(72) Inventor: Takahiro Fukase, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/072,711

(22) Filed: Mar. 17, 2016

(65) Prior Publication Data

US 2016/0277644 A1 Sep. 22, 2016

(30) Foreign Application Priority Data

Mar. 20, 2015 (JP) .................................. 2015-057263

(51) Int. Cl.
H04N 1/60 (2006.01)

(52) U.S. Cl.
CPC ................................. H04N 1/6041 (2013.01)

(58) Field of Classification Search
CPC .................................................. H04N 1/6041
USPC ................................................ 358/1.9, 1.15
See application file for complete search history.

(56) References Cited

U.S. PATENT DOCUMENTS

| | | | | |
|---|---|---|---|---|
| 2005/0243337 A1* | 11/2005 | Kuhn | ................... | H04N 1/6033 358/1.9 |
| 2011/0299104 A1* | 12/2011 | Seo | ........................... | G01J 3/02 358/1.9 |
| 2013/0258368 A1 | 10/2013 | Shigemoto et al. | | |
| 2014/0268207 A1* | 9/2014 | Fukase | ................. | G06K 15/027 358/1.14 |
| 2014/0268260 A1* | 9/2014 | Kitai | .................... | H04N 1/6027 358/521 |
| 2015/0078627 A1* | 3/2015 | Fukase | .................... | G06T 7/001 382/112 |

FOREIGN PATENT DOCUMENTS

| | | |
|---|---|---|
| JP | 2009-239529 | 10/2009 |
| JP | 2013-228370 | 11/2013 |

* cited by examiner

*Primary Examiner* — Quang N Vo
(74) *Attorney, Agent, or Firm* — Duft Bornsen & Fettig LLP

(57) ABSTRACT

A color processing apparatus includes circuitry that obtains a color patch scanned image acquired by scanning a color patch, acquires a pixel value of the color patch scanned image, calculates pixel value variance information indicating a variance of the pixel values based on the acquired pixel values, and determines whether or not the color patch scanned image is defective based on the pixel value variance information.

8 Claims, 14 Drawing Sheets

MASTER IMAGE SCANNED IMAGE

COLOR PROCESSING APPARATUS, INSPECTION APPARATUS, AND COLOR PROCESSING METHOD

CROSS-REFERENCE TO RELATED APPLICATIONS

This patent application is based on and claims priority pursuant to 35 U.S.C. § 119(a) to Japanese Patent Application No. 2015-057263, filed on Mar. 20, 2015 in the Japan Patent Office, the entire disclosures of which are hereby incorporated by reference herein.

BACKGROUND

Technical Field

The present invention relates to a color processing apparatus, an inspection apparatus, and a color processing method.

Background Art

While printed matter had been inspected manually in the past, an inspection apparatus that inspects printed matter automatically has become popular as a post-production process of printing recently. In the inspection apparatus, first, a master image as a reference is generated from image data to be printed. Subsequently, the inspection apparatus compares the generated master image with a scanned image of the printed matter to be inspected to determine failure of the printed matter based on a grade of difference between them The master image is generated by converting a print image (a bitmap image) in Cyan, Magenta, Yellow, and Key plate (CMYK) format generated from the image data to be printed into a print image (a bitmap image) in Red, Green, and Blue (RGB) format as a scanned image format. A color conversion table is used for converting color space of an image into different color space such as the conversion from the print image in CMYK format into the print image in RGB format described above.

The color conversion table described above is generated by associating the print image in CMYK format of a color chart including various graded color patches with a scanned image in RGB format generated by scanning a print sheet on which the print image if printed. More specifically, the color conversion table is generated by mapping colorimetric values of color patches on the print image onto colorimetric values of color patches on the scanned image.

To generate an accurate color conversion table, it is necessary that a part of a scanned image of a color chart, i.e., a scanned image of a color patch, has no failure. To check if the scanned image of the color patch has no failure, a technology that compares colorimetric values of the scanned image of the color patch as a reference value with colorimetric values of other color patches is known.

SUMMARY

An example embodiment of the present invention provides a color processing apparatus that includes circuitry that obtains a color patch scanned image acquired by scanning a color patch, acquires a pixel value of the color patch scanned image, calculates pixel value variance information indicating a variance of the pixel values based on the acquired pixel values, and determines whether or not the color patch scanned image is defective based on the pixel value variance information.

Further embodiments of the present invention provide an inspection apparatus and a color processing method.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
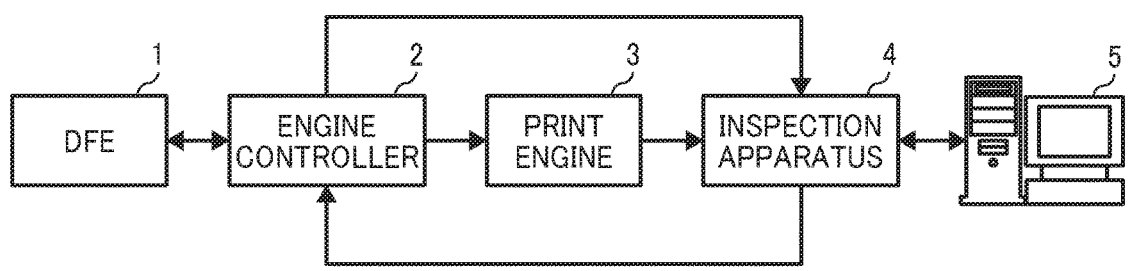
FIG. 1 is a diagram illustrating a configuration of an image inspection system including an inspection apparatus as an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In the known technology, it is required to provide a different color patch to check whether or not the scanned image of a color patch to be performed colorimetry has a failure.

The above issue is applied to not only the inspection apparatus described above but also apparatuses such as a printer that uses a color conversion table in performing calibration to achieve same output colors always against input colors reducing color fluctuation due to idiosyncrasy among apparatuses and environment.

An embodiment is described below in detail with reference to figures.

In the embodiment described below, a color patch failure determination apparatus that can check whether or not the scanned image of the color patch to be performed colorimetry has a failure without using other color patches is provided.

In the embodiment described below, in an image inspection system including an inspection apparatus that checks an output result by comparing a scanned image of an image forming output result with a master image, a function that generates a color conversion table used for generating the master image is described.

FIG. 1 is a diagram illustrating an image inspection system in this embodiment.

As shown in FIG. 1, the image inspection system in this embodiment includes a DFE 1, an engine controller 2, a print engine 3, an inspection apparatus 4, and an interface terminal 5. The DFE 1 is an image processing apparatus that generates image data to be output, i.e., bitmap data as an image to be output based on a received print job and outputs the generated bitmap data to the engine controller 2.

The engine controller 2 controls the print engine 3 and instructs the print engine 3 to form and output an image based on the bitmap data received from the DFE 1. In addition, the engine controller 2 transfers the bitmap data received from the DFE 1 as information as an origin of an inspection image to be referred when the inspection apparatus 4 inspects the result of outputting an image by the print engine 3 to the inspection apparatus 4.

The print engine 3 is an image forming device (image forming apparatus) that forms and outputs an image on a sheet as a recording medium based on the bitmap data under control of the engine controller 2. For example, in addition to the sheet described above, sheet-shaped materials such as a film and a plastic on which an image is formed can be adopted as the recording medium.

The inspection apparatus 4 generates the master image based on the bitmap data input by the engine controller 2. In addition, the inspection apparatus 4 is an image inspection apparatus that inspects the output result by comparing a scanned image that the scanner generates by scanning the sheet output by the print engine 3 with the generated master image described above.

In case of determining that the output result has a failure, the inspection apparatus 4 reports information indicating a page that has the determined failure to the engine controller 2. As a result, the engine controller 2 reprints the failed page.

The interface terminal 5 is an information processing terminal that displays a Graphical User Interface (GUI) for confirming the failure determination result by the inspection apparatus 4 and a GUI for configuring parameters for the inspection. For example, the interface terminal 5 can be implemented by using a generic information processing terminal such as a personal computer (PC).

Figure 2:
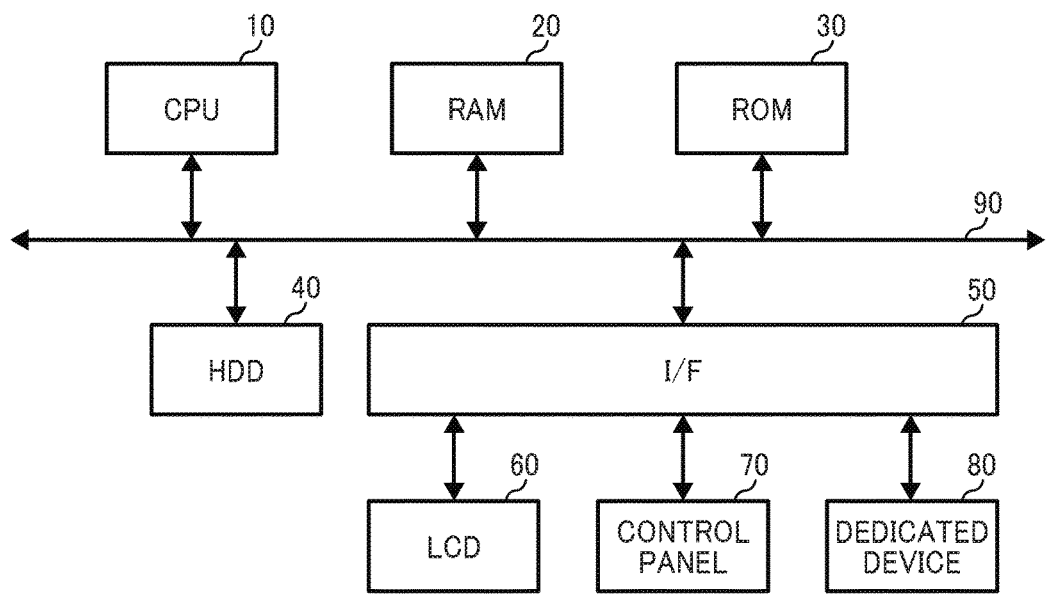
FIG. 2 is a block diagram illustrating a hardware configuration of an inspection apparatus as an embodiment of the present invention.

Here, hardware that constructs the DFE 1, the engine controller 2, the print engine 3, the inspection apparatus 4, and the interface terminal 5 is described below with reference to FIG. 2. FIG. 2 is a block diagram illustrating a hardware configuration of the inspection apparatus in this embodiment. In FIG. 2, the hardware configuration of the inspection apparatus 4 is illustrated. However, other apparatuses have a similar configuration.

As shown in FIG. 2, the inspection apparatus in this embodiment includes the similar configuration as information processing apparatuses such as a general PC or server etc. That is, in the inspection apparatus 4 in this embodiment, a Central Processing Unit (CPU) 10, a Random Access Memory (RAM) 20, a Read Only Memory (ROM) 30, a hard disk drive (HDD) 40, and an interface (I/F) 50 are connected with each other via a bus 90. In addition, a Liquid Crystal Display (LCD) 60, an operational unit 70, and a dedicated device 80 are connected to the I/F 50.

The CPU 10 is a processor and controls the whole operation of the inspection apparatus 4. The RAM 20 is a volatile storage device that can read/write information at high speed and is used as a work area when the CPU 10 processes information. The ROM 30 is a read-only non-volatile storage medium and stores programs such as firmware. The HDD 40 is a non-volatile storage medium that can read/write information and stores the OS, various control programs, and application programs etc.

The I/F 50 connects the bus 90 with various hardware and network etc. and controls them. The LCD 60 is a visual user interface to check status of the inspection apparatus 4. The operational unit 70 is a user interface such as a keyboard and mouse etc. to input information to the inspection apparatus 4.

The dedicated device 80 is hardware that implements dedicated functions in the engine controller 2, the print engine 3, and the inspection apparatus 4. In the print engine 3, the dedicated device 80 is carrying mechanism that carries a sheet on which an image is formed and a plotter device that forms and outputs the image on the sheet. In the engine controller 2 and the inspection apparatus 4, the dedicated device 80 is a dedicated processor that processes images at high speed. For example, the processor described above can be implemented using an Application Specific Integrated Circuit (ASIC). In addition, the scanner that scans an image output on the sheet is implemented by the dedicated device 80.

In this hardware configuration described above, programs stored in the ROM 30 and programs stored in storage devices such as HDD 40, and optical discs (not shown in figures) are read to the RAM 20, and a software controlling unit is constructed by executing operation in accordance with those programs by the CPU 10. Functional blocks that implement capabilities of the DFE 1, the engine controller 2, the print engine 3, the inspection apparatus 4, and the interface terminal 5 of this embodiment are constructed by a combination of the software controlling units described above and hardware.

Figure 3:
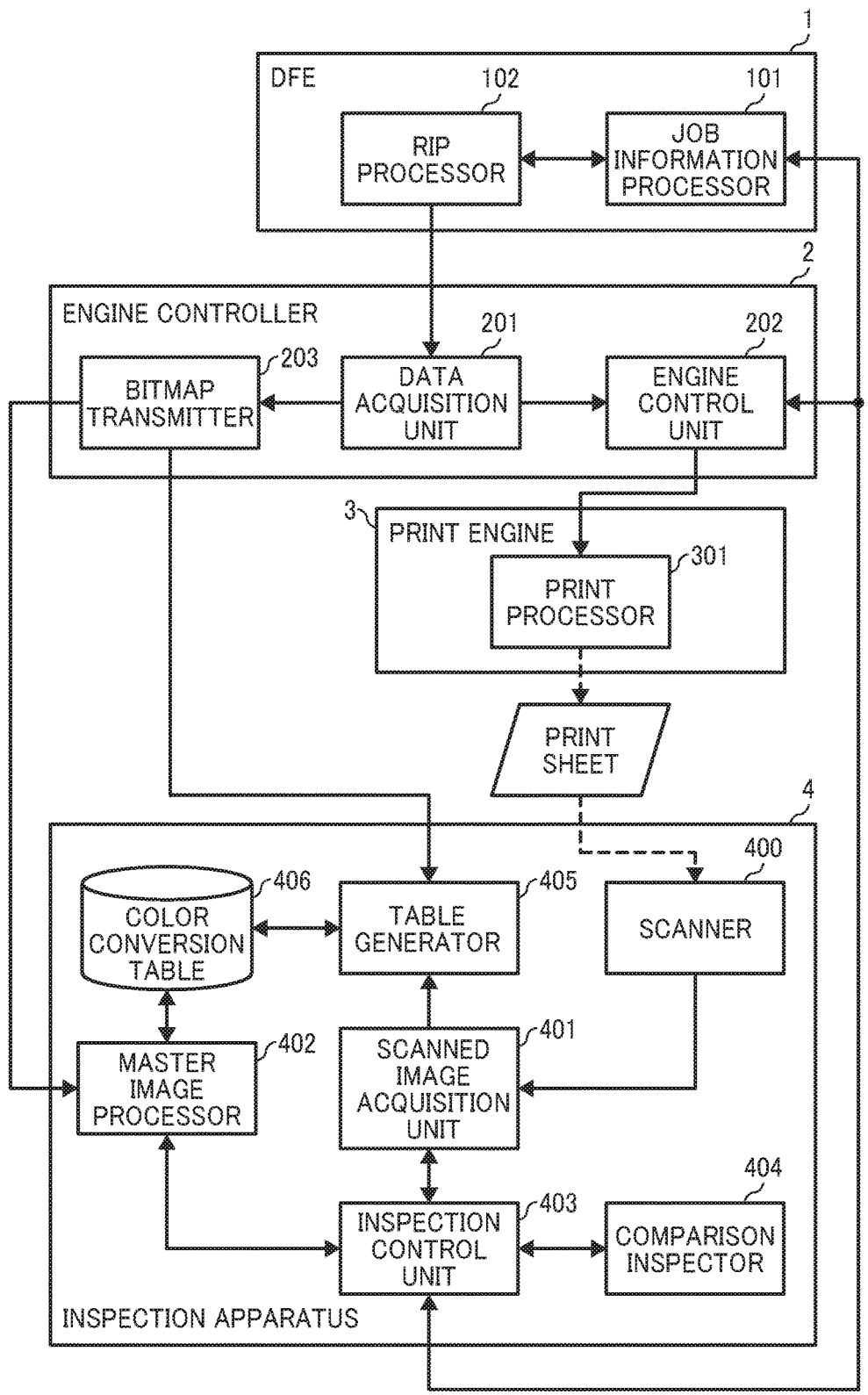
FIG. 3 is a block diagram illustrating functional configurations of a Digital Front End (DFE), an engine controller, a print engine, and the inspection apparatus as an embodiment of the present invention.

FIG. 3 is a block diagram illustrating functional configurations of the DFE 1, the engine controller 2, the print engine 3, and the inspection apparatus 4 in this embodiment. In FIG. 3, solid lines indicate data transmission, and broken lines indicate flow of a sheet. As shown in FIG. 3, the DFE 1 in this embodiment includes a job information processor 101 and a RIP processor 102. In addition, the engine controller 2 includes a data acquisition unit 201, an engine control unit 202, and a bitmap transmitter 203. Furthermore, the print engine 3 includes a print processor 301. Lastly, the inspection apparatus 4 includes a scanner 400, a scanned image acquisition unit 401, a master image processor 402, an inspection controller 403, a comparison inspector 404, a table generator 405, and a color conversion table storage unit 406.

The job information processor 101 controls an operation of forming and outputting an image in accordance with a print job input via a network externally and a print job generated based on image data stored in the DFE 1 by user operation. In forming and outputting an image, the job information processor 101 instructs the RIP processor 102 to generate bitmap data based on image data included in the print job.

Under control of the job information processor 101, the RIP processor 102 generates bitmap data that the print engine 3 uses for forming and outputting an image based on the image data included in the print job. The bitmap data is information on pixels that constructs the image to be formed and output.

The print engine 3 in this embodiment forms and outputs an image based on an image that has binary values for each color of CMYK. By contrast, generally, image data included in a print job is a multi-valued image that each pixel is expressed in multiple tones such as a 256-step gradation. Therefore, the RIP processor 102 converts the image data included in the print job from the multi-valued image into a less-valued image, generates bitmap data that has binary values for each color of CMYK, and transfers the generated bitmap data to the engine controller 2.

The data acquisition unit 201 acquires the bitmap data input by the DFE 1 and drives the engine control unit 202 and the bitmap transmitter 203. The engine control unit 202 instructs the print engine 3 to form and output an image based on the bitmap data transferred by the data acquisition unit 201. The bitmap transmitter 203 transfers the bitmap data acquired by the data acquisition unit 202 to the inspection apparatus 4 to generate the master image.

The print processor 301 is an image forming unit that acquires the bitmap data input by the engine controller 2, forms an image on the print sheet, and outputs the sheet on which the image is printed. While the print processor 301 in this embodiment is implemented using a generic electrophotographic image forming mechanism, it is possible to adopt other image forming mechanisms such as an inkjet image forming mechanism.

The scanner 400 is an image scanning unit that scans an image formed on a surface of the print sheet that the print processor 301 performs printing and outputs a scanned image. For example, the scanner 400 is a line scanner located on a carrying path of the print sheet output by the print processor 301 inside the inspection apparatus 4, and the scanner 400 scans an image formed on the sheet by scanning the surface of the print sheet while the print sheet is carried.

The inspection apparatus 4 inspects the scanned image generated by the scanner 400. Since the scanned image is generated by scanning the surface of the output sheet on which the image is formed, the scanned image indicates an output result. The scanned image acquisition unit 401 acquires information on the scanned image generated by scanning the surface of the print sheet using the scanner 400. Information on the scanned image (scanned image to be inspected) that the scanned image acquisition unit 401 acquires is input to the comparison inspector 404 for comparison and inspection. It should be noted that the scanned image is input to the comparison inspector 404 under control of the inspection controller 403. In that case, after the inspection controller 403 acquires the scanned image, the scanned image is input to the comparison inspector 404.

As described above, the master image processor 402 acquires the bitmap data input by the engine controller 2 and generates the master image as an image used for inspection to be compared with the image to be inspected described above. That is, the master image processor 402 functions as an inspection image generator that generates the master image as the inspection image used for inspecting the scanned image based on the image that is formed and output. The operation of generating the master image performed by the master image processor 402 is described later in detail.

The inspection controller 403 controls the whole inspection apparatus 4, and functional units included in the inspection apparatus 4 operates under control of the inspection controller 403. The comparison inspector 404 compares the scanned image input by the scanned image acquisition unit 401 with the master image generated by the master image processor 402 to determine whether or not the image has been formed and output as intended. The comparison inspector 404 is implemented by using the ASIC described above to process vast amount of calculation at high speed.

In the comparison inspector 404, scanned image of 200 dpi expressed in 8 bits for each color of RGB is compared with the master image of 200 dpi expressed in 8 bits for each color of RGB for each corresponding pixel, and difference values of pixel values in 8 bits for each color of RGB for each pixel described above are calculated. Based on order between an absolute value of the calculated difference value (hereinafter referred to as "difference value") and a threshold value, the inspection controller 403 determines whether or not the scanned image has a failure.

Figure 4:
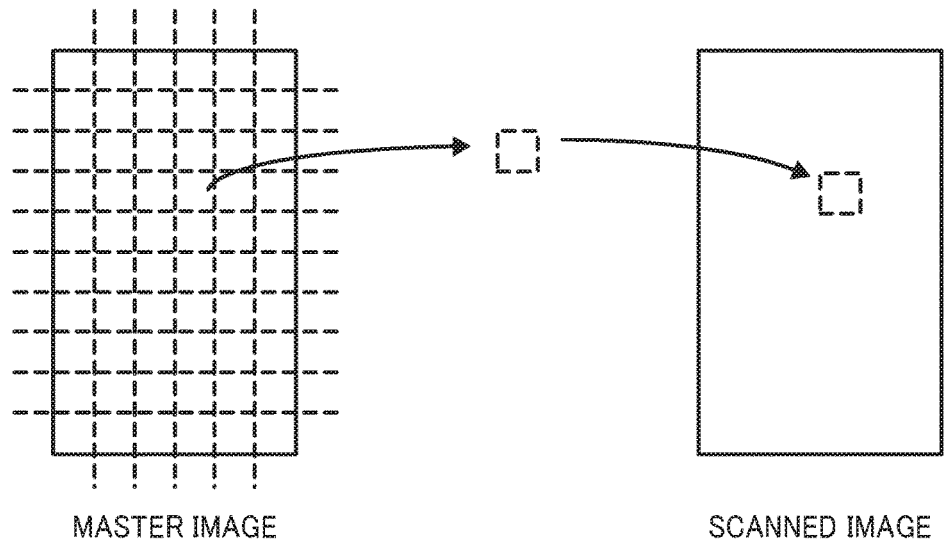
FIG. 4 is a diagram illustrating a comparison inspection as an embodiment of the present invention.

In comparing the scanned image with the master image, as shown in FIG. 4, the comparison inspector 404 calculates difference between pixel values for each pixel, i.e., gradation, by imposing the master image divided into predetermined areas onto the scanned image corresponding to the divided area. The inspection controller 403 acquires an image area to be imposed from each of the master image and the scanned image and inputs it into the comparison inspector 404 to implement the operation described above.

Furthermore, the inspection controller 403 shifts the image area acquired from the scanned image vertically and horizontally, determines a position where a total value of the calculated difference values is minimized as an accurate imposing position, and adopts calculated difference values for each pixel as a comparison result. As a result, the comparison inspector 404 can output vertical and horizontal shift amount in determining the imposing position along with the difference values for each pixel.

As shown in FIG. 4, each of quadrille-divided areas corresponds to the predetermined area that the difference values for each pixel described above are summed. Sizes of the divided areas in FIG. 4 are determined based on an area that the comparison inspector 404 implemented by the ASIC can compare the pixel values at once for example.

By performing the operation described above, the difference values are calculated after aligning the scanned image with the master image. By comparing the calculated difference values with a predetermined threshold value, it is possible to determine whether or not the image has a failure. In addition, for example, if reduction scales are different between the whole scanned image and the whole master image, it is possible to reduce an effect of scaling by aligning the divided areas as shown in FIG. 4.

In each area divided as shown in FIG. 4, it is predicted that amount of misalignment between adjacent areas approximates to each other comparatively. Therefore, in performing comparison inspection for each divided area, calculation is performed shifting vertically and horizontally with a central focus on amount of misalignment determined by comparing adjacent areas. As a result, if the number of calculation shifting vertically and horizontally is reduced, it is highly possible to perform the calculation at the accurate imposing position, reducing the total amount of calculation.

The table generator 405 generates the color conversion table used when the master image processor 402 generates the master image and stores the color conversion table in the color conversion table storage unit 406. In addition, the table generator 405 determines whether or not there is a failure such as taint in color patches of color charts including color patches in various gradations used in generating the color conversion table. The table generator 405 functions as a color patch failure determination apparatus that determines whether or not the color patch has a failure. A color patch failure determination program implements the operation of the table generator 405. The color conversion table and the operation by the table generator 405 are described in detail later.

Figure 5:
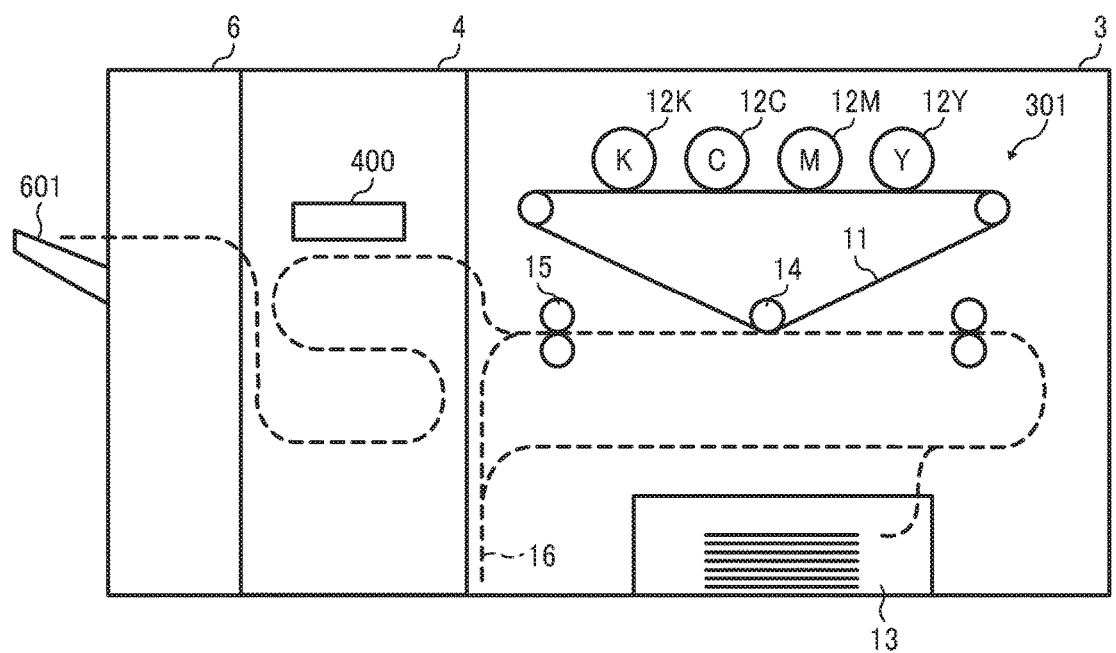
FIG. 5 is a diagram illustrating a configuration of the print engine, the inspection apparatus, and a stacker as an embodiment of the present invention.

Next, a mechanical configuration of the print engine 3, the inspection apparatus 4, and the stacker 6 and a carrying path of a sheet are described below with reference to FIG. 5. As shown in FIG. 5, the print processor 301 included in the print engine 3 in this embodiment includes photoconductor drums 12Y, 12M, 12C, and 12K for each color laid out along with the conveyance belt 11 as an endless carrying unit, and the configuration is called a tandem type.

That is, the photoconductor drums 12Y, 12M, 12C, and 12K are laid out from upstream of the transferring direction along with the conveyance belt 11 as an intermediate transfer belt on which an intermediate transfer image being transferred on a sheet fed by the sheet feeding tray 13 is formed. Hereinafter, the photoconductor drums 12Y, 12M, 12C, and 12K are collectively referred to as the photoconductor drums 12.

A full-color image is formed by superimposing images for each color developed using toner on the surface of the photoconductor drums 12 for each color on the conveyance belt 11 and transferring the superimposed image. The full-color image formed on the conveyance belt 11 as described above is transferred to the surface of the sheet being carried on the path at a position closest to the transferring path of the sheet (illustrated in FIG. 5 using broke lines) by a function of the transfer roller 14.

After the image is formed on the sheet, the sheet is further transferred, the image is fixed using the fixing roller 15, and the sheet is transferred to the inspection apparatus 4. In case of duplex printing, after an image is formed on one side of the sheet, the sheet is transferred to a reverse path 16 and reversed. Subsequently, the sheet is transferred to the transfer position of the transfer roller 14 again.

The scanner 400 scans both sides of the sheet transferred by the print processor 301 on the transfer path of the sheet inside the inspection apparatus 4, generates a scanned image, and outputs the scanned image to the scanned image acquisition unit 401 constructed by the information processing apparatus in the inspection apparatus 4. In addition, after being scanned by the scanner 400, the sheet is further transferred in the inspection apparatus 4, transferred to the stacker 6, and ejected on the output tray 601. In FIG. 5, the scanner 400 is located on one side of the sheet only on the transfer path of the sheet in the inspection apparatus 4. However, it is possible to locate the scanners 400 on each of both sides of the sheet to inspect both sides of the sheet.

Figure 6:
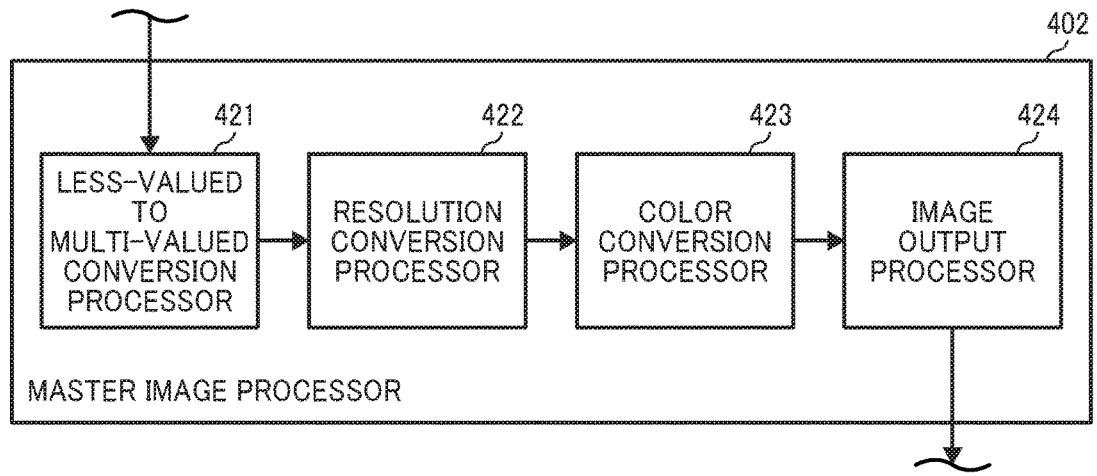
FIG. 6 is a block diagram illustrating a functional configuration of a master image processor as an embodiment of the present invention.

Next, a functional configuration of the image processor 402 in this embodiment is described below. FIG. 6 is a block diagram illustrating a functional configuration of the master image processor 402 in this embodiment. As shown in FIG. 6, the master image processor 402 includes a less-valued to multi-valued conversion processor 421, a resolution conversion processor 422, a color conversion processor 423, and an image output processor 424. The dedicated device 80 in FIG. 2, i.e., the hardware constructed by the ASIC operates under control of software to implement the master image processor 402 in this embodiment.

The less-valued to multi-valued conversion processor 421 performs a less-valued to multi-valued conversion process on a binary image expressed by color-exists or no-color and generates a multi-valued image. The bitmap data in this embodiment is information being input to the print engine 3, and the print engine 3 forms and outputs an image based on binary images for each color of CMYK. However, since the scanned image to be inspected is a multi-valued image having multiple gradations for each color of RGB as trichromatic colors, the binary image is converted into the multi-valued image by the less-valued to multi-valued conversion processor 421. An example of the multi-valued image is an image expressed using 8 bits for each color of CMYK.

The less-valued to multi-valued conversion processor 421 performs an 8-bit expansion process and a smoothing process as the less-valued to multi-valued conversion process. In the 8-bit expansion process, 1-bit data including a value of 0 or 1 is converted into 8-bit data, i.e., 0 is converted into 0, and 1 is converted into 255. In the smoothing process, a smoothing filter is applied to the converted 8-bit data to smooth the image.

In this embodiment, the print engine 3 forms an image based on the binary image for each color of CMYK, and the maser image processor 402 includes the less-valued to multi-valued conversion processor 421. However, it should be noted that is an example. That is, if the print engine 3 forms and outputs an image based on the multi-valued image, the less-valued to multi-valued conversion processor 421 can be omitted.

In addition, in some cases, the print engine 3 forms and outputs an image based on not 1-bit image but less-valued image such as 2 bits. In that case, it is possible to cope with the case by modifying the function of the 8-bit expansion process. That is, in case of 2 bits, gradation values are 0, 1, 2, and 3. As a result, in the 8-bit expansion process, 0 is converted to 0, 1 is converted to 85, 2 is converted to 170, and 3 is converted to 255.

The resolution conversion processor 422 converts a resolution so that a resolution of the multi-valued image generated by the less-valued to multi-valued conversion processor 421 corresponds to a resolution of the scanned image to be inspected. In this embodiment, since the scanner 400 generates the scanned image in 200 dpi, the resolution conversion processor 422 converts the resolution of the multi-valued image generated by the less-valued to multi-valued conversion processor 421 to 200 dpi.

The color conversion processor 423 acquires the image whose resolution is converted by the resolution conversion processor 422 and converts its gradation and color expression format (hereinafter referred to as "color conversion"). In the gradation conversion process, a color tone is converted so that a color tone of the master image is adjusted to a color tone of the image formed on the sheet by the print processor 301 and a color tone of the image scanned and generated by the scanner 400.

In the color conversion process, an image in CMYK format is converted into an image in RGB format. As described above, since the scanned image in this embodiment is an image in RGB format, the color conversion processor 423 converts the gradation-converted image in CMYK into the image in RGB format. As a result, multi-valued image that each pixel is expressed in 8 bits for each color of RGB (24 bits in total) in 200 dpi is generated.

In performing the color conversion process and the gradation conversion process described above, the color conversion table is used. The color conversion table is color conversion information that converts an image into an image in different color space. The color conversion table in this embodiment is color conversion information that converts color space (CMYK) of the image to be inspected for outputting an image into color space (RGB) of the scanned image generated by scanning the image output on the recording medium.

More specifically, the color conversion table is information associating values in CMYK format as input values before conversion with values in RGB format as output values after conversion. The input values before conversion are pixel values of each color patch (in CMYK format) in an original image for forming color patches in various gradation colors. The output values after conversion are pixel values of each color patch in the scanned image (in RGB format) generated by scanning the sheet on which the image of the color chart including color patches of the input values is formed by the print processor 301

The color conversion processor 423 acquires the color conversion table stored in the color conversion table storage unit 406 and converts the image in CMYK format on which the gradation conversion process is performed into the image in RGB format. The image output processor 424 outputs the master image generated by the operation performed by units up to the color conversion processor 423. As a result, the inspection controller 403 acquires the master image from the master image processor 402.

Figure 7:
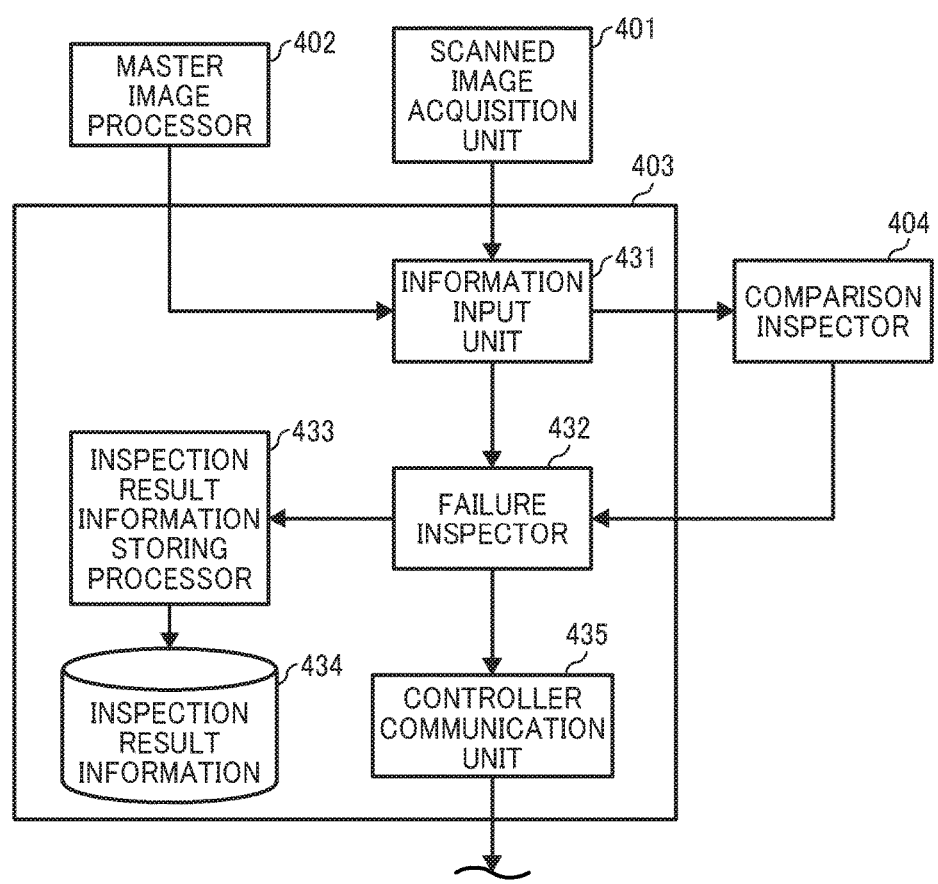
FIG. 7 is a block diagram illustrating a functional configuration of an inspection controller as an embodiment of the present invention.
Figure 8:
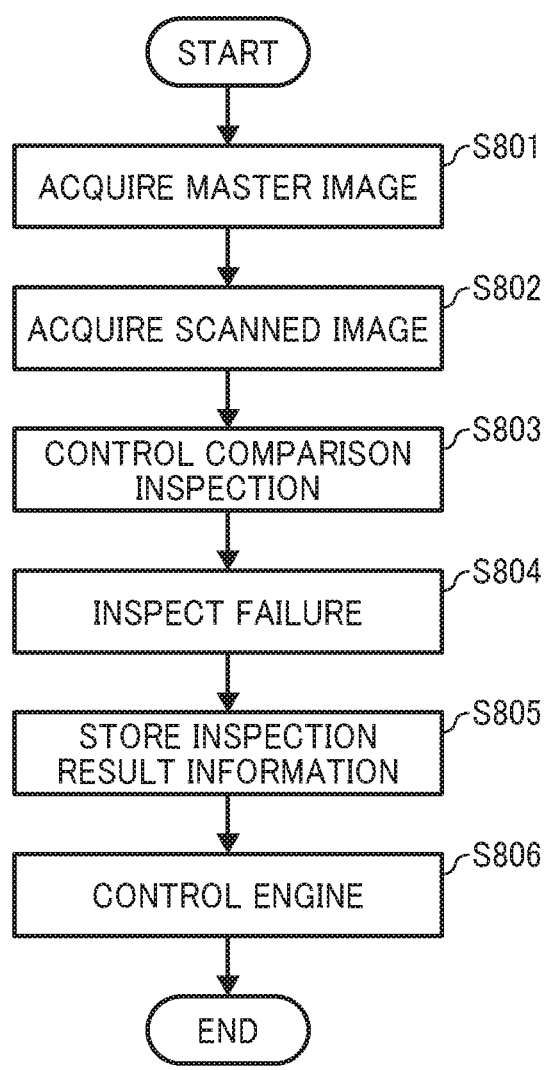
FIG. 8 is a flowchart illustrating an inspection operation as an embodiment of the present invention.

Next, a functional configuration of the inspection controller 403 in this embodiment is described below. FIG. 7 is a block diagram illustrating a functional configuration of the inspection controller 403 in this embodiment. FIG. 8 is a flowchart illustrating an operation of inspecting a failure in the scanned image performed by the inspection controller 403 in this embodiment. As shown in FIG. 7, the inspection controller 403 in this embodiment includes an information input unit 431, a failure inspector 432, an inspection result information storing processor 433, an inspection result information storage unit 434, and a controller communication unit 435. The operation of inspecting a failure performed by the inspection controller 403 in this embodiment is described below with reference to FIG. 8.

In the inspection controller 403 in this embodiment, as shown in FIG. 8, first, the information input unit 431 acquires the master image from the master image processor 402 in S801 and acquires the scanned image from the scanned image acquisition unit 401 in S802. Since the operation in S801 and the operation in S802 are context-free, it is possible to perform them in reverse order, or it is possible to perform them concurrently.

As shown in FIG. 4 previously, after acquiring the master image and the scanned image, the information input unit 431 extracts a predetermined area of image from each of the master image and the scanned image and inputs them into the comparison inspector 404 to instruct the comparison inspector 404 to perform comparison inspection on the images in S803.

By performing the operation in S803, a difference image that indicates difference values between pixels in the scanned image and pixels in the master image is generated. The failure inspector 432 acquires the generated difference image and inspects a failure based on the acquired difference image in S804. More specifically, in S804, if a total value (or an average value) of pixel values in the acquired difference image (hereinafter referred to as "difference total value") is equal to or more than a threshold value, the failure inspector 432 determines that the area of the scanned image input to the comparison inspector 404 has a failure.

After finishing the failure inspection process in S804, the inspection result information storage processor 433 stores inspection result information including a position and type of the failure determined by the failure inspector 432 in the inspection result information storage unit 434 in S805.

The controller communication unit 435 controls the engine such as processing reprinting based on the determination result by the failure inspector 432 in S806. The operation performed by the inspection controller 403 is repeated for all pages for one print job. After finishing outputting and inspecting for all pages, the process ends.

It is possible that the inspection controller 403 generates display information for displaying the inspection result information stored in the inspection result information storage unit 434 on the display unit of the interface terminal 5 and outputs the display information to the interface terminal 5 to control displaying the determination result. The interface terminal 5 displays a screen indicating information on the failure based on the display information input from the inspection controller 403.

Figure 9:
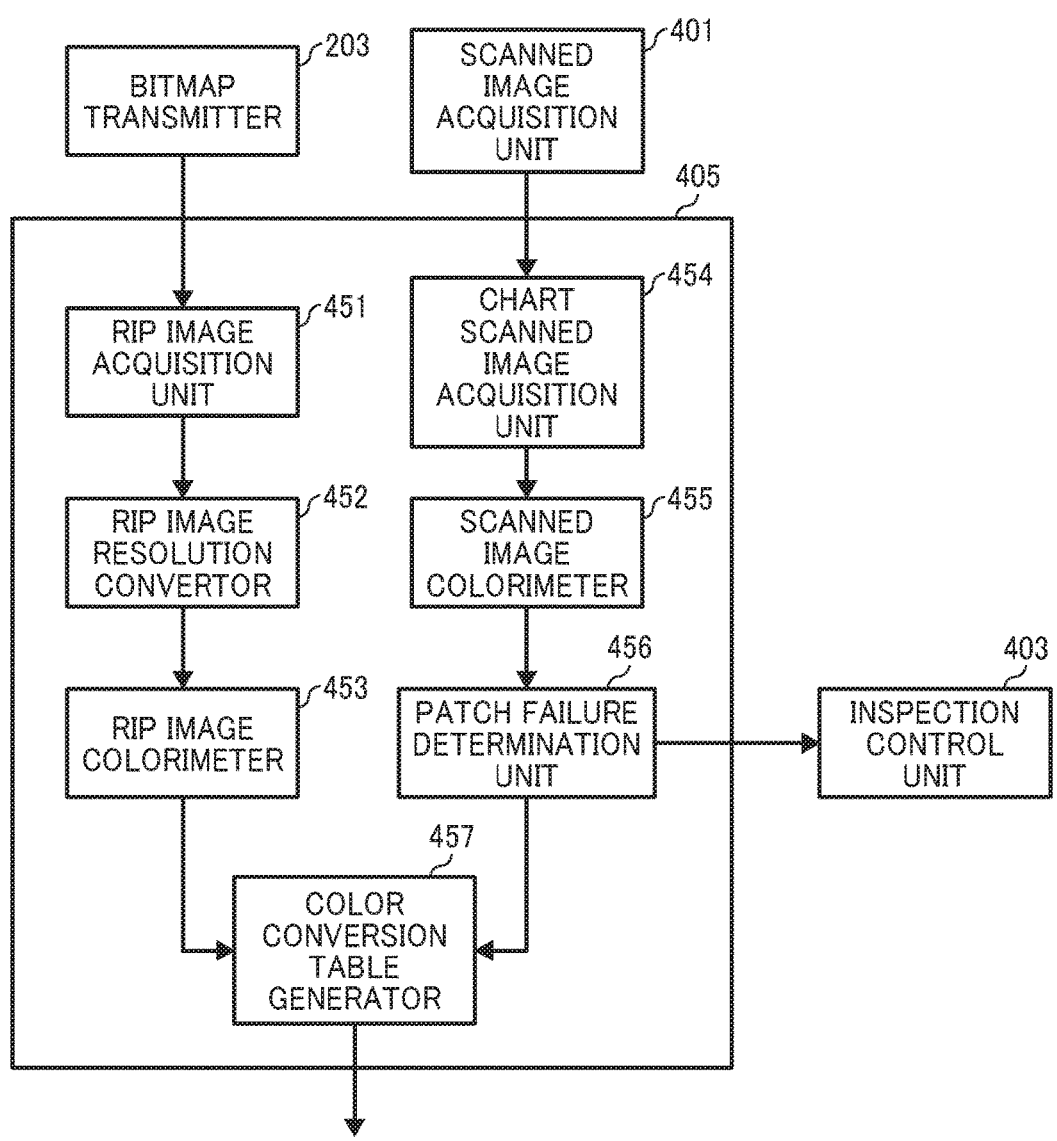
FIG. 9 is a block diagram illustrating a functional configuration of a table generator as an embodiment of the present invention.

Next, a functional configuration of the table generator 405 in this embodiment is described below. FIG. 9 is a block diagram illustrating a functional configuration of the table generator 405 in this embodiment. In addition, FIG. 10 is a flowchart illustrating an operation of generating the color conversion table in this embodiment.

As shown in FIG. 9, the table generator 405 in this embodiment includes a RIP image acquisition unit 451, a RIP image resolution converter 452, a RIP image colorimeter 453, a chart scanned image acquisition unit 454, a scanned image colorimeter 455, a patch failure determination unit (determining unit) 456, and a color conversion table generator 457. In addition, the table generator 405 functions as a color processor that generates the color conversion table for converting an image into different color space. An operation of generating the color conversion table performed by the table generator 405 in this embodiment is described below with reference to FIG. 10.

Figure 10:
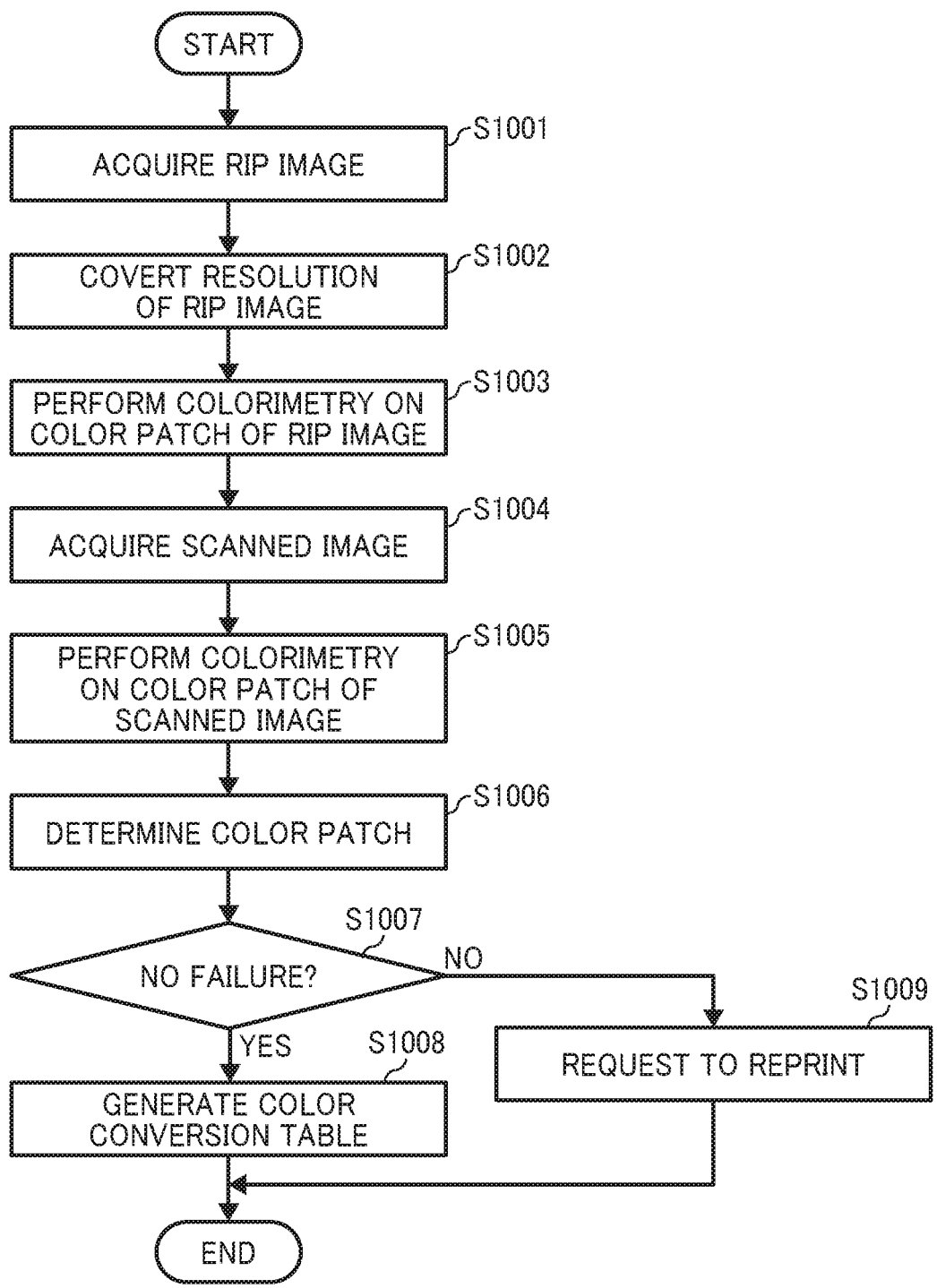
FIG. 10 is a flowchart illustrating an operation of generating a color conversion table as an embodiment of the present invention.

As shown in FIG. 10, in the table generator 405 in this embodiment, first, the RIP image acquisition unit 451 acquires bitmap data of a color chart for generating the color conversion table from the bitmap transmitter 203 in S1001.

Figure 11:
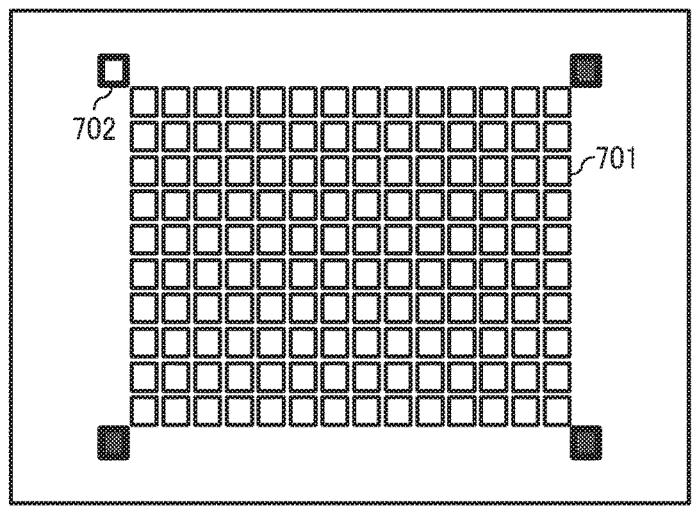
FIG. 11 is a diagram illustrating a color chart for generating the color conversion table as an embodiment of the present invention.

FIG. 11 is a diagram illustrating a color chart for generating the color conversion table in this embodiment. As shown in FIG. 11, in the color chart, color patches 701 in various gradation colors are laid out in a reticular pattern. In addition, in four corners of the color chart, markers 702 as references used by the table generator 405 to grasp positions of the color patches 701 are laid out. One of the markers 702 has a pattern different from other markers 702 to grasp the direction of the color chart. Generally, each of the color patches 701 has an area larger than a predetermined value (e.g., 7 millimeters square) with uniform color to reduce scanning error such as noise.

The RIP image acquisition unit 451 acquires bitmap data for outputting the color chart in FIG. 11 on the sheet (hereinafter referred to as "RIP image") from the bitmap transmitter 203 and stores it in a storage unit such as the RAM 20 etc. In this case, the storage unit functions as a color patch bitmap data storage unit that stores color patch bitmap data for outputting at least one color patch that constructs the color chart.

The RIP image resolution converter 452 converts a resolution of the RIP image stored in the storage unit by the RIP image acquisition unit 451 into 200 dpi to smooth dots and enhance processing speed in S1002. After the resolution of the RIP image is converted, the RIP image colorimeter 453 performs colorimetry on each color patch 701 based on the RIP image whose resolution is converted to 200 dpi in S1003.

Figure 12:
FIG. 12 is a diagram illustrating a color patch included in the color chart as an embodiment of the present invention.

More specifically, the RIP image colorimeter 453 acquires an average value of pixel values included in a predetermined area (e.g., 30 pixels square) from the center of each color patch whose position is grasped with reference to the markers 702 included in the RIP image as a colorimetric value. FIG. 12 is a diagram illustrating one of the color patches 701 included in the color chart in FIG. 11 in this embodiment. For example, the RIP image colorimeter 453 performs colorimetry on an area surrounded by broken lines 703 in FIG. 12 (hereinafter referred to as "colorimetry target area"). The reason that the colorimetry is performed on the predetermined area from the center of the color patch is to reduce influence of varying pixel values around edges by being blurred in scanning the color patch and converting the resolution. That is, the RIP image colorimeter 453 functions as a color patch bitmap data pixel value acquisition unit that acquires pixel values of color patch bitmap data.

On the other hand, the chart scanned image acquisition unit 454 acquires the scanned image of the color chart from the scanned image acquisition unit 401 and stores it in the storage unit such as the RAM 20 etc. in S1004. The scanned image of the color chart is generated when the RIP image of the color chart acquired by the RIP image acquisition unit 4551 in S1001 is formed on the sheet by the print controller 301 and the scanner 400 scans the sheet. In this case, the storage unit functions as a color patch scanned image storage unit that stores the color patch scanned image as the scanned image generated by scanning at least one color patch among color patches that construct the color chart.

The scanned image colorimeter 455 performs colorimetry on each color patch 701 just like the RIP image colorimeter 453 described above base on the scanned image of the color chart acquired by the chart scanned image acquisition unit 454 in S1005. More specifically, the scanned image colorimeter 455 acquires an average value of pixel values included in a predetermined area (e.g., 30 pixels square) from the center of each color patch whose position is grasped with reference to the markers 702 included in the scanned image of the color chart as a colorimetric value. That is, the scanned image colorimeter 455 functions as a pixel value acquisition unit that acquires pixel values of the color patch scanned image. Since the operation in S1001 to S1003 and the operation in S1004 and the operation in S1005 are context-free, it is possible to perform them in reverse order, or it is possible to perform them concurrently.

The patch failure determination unit 456 determines whether or not each of the color patches 701 performed colorimetry by the scanned image colorimeter 455 has a failure such as taint or streak etc. in S1006. The operation of determining a failure performed by the patch failure determination unit 456 is described in detail later. If it is determined that the color patch 701 does not have a failure (YES in S1007), the color conversion table generator 457 generates the color conversion table in S1008.

More specifically, in S1008, the color conversion table generator 457 generates the color conversion table associating colorimetric values of the RIP image in each color patch performed colorimetry in S1003 with colorimetric values of the scanned image of each color patch performed colorimetry in S1005.

By contrast, if it is determined that the color patch 701 has a failure (NO in S1007), the patch failure determination unit 456 reports a request for reprint to the inspector controller 403 in S1009. As a result, the image of the color patch is formed on the sheet again.

Figure 13:
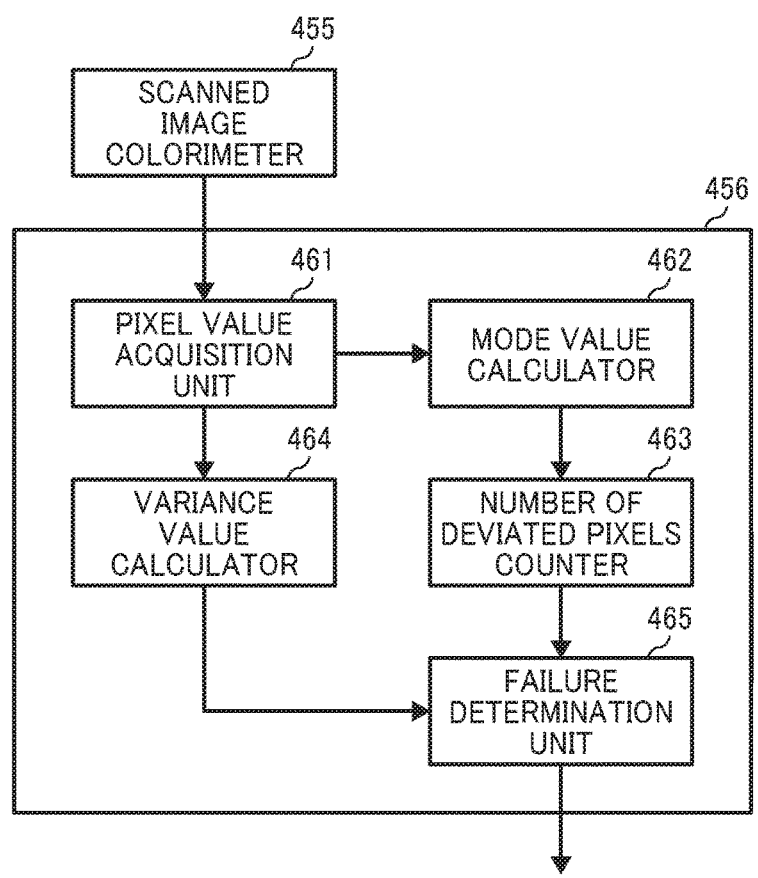
FIG. 13 is a block diagram illustrating a functional configuration of a patch failure determination unit as an embodiment of the present invention.
Figure 14:
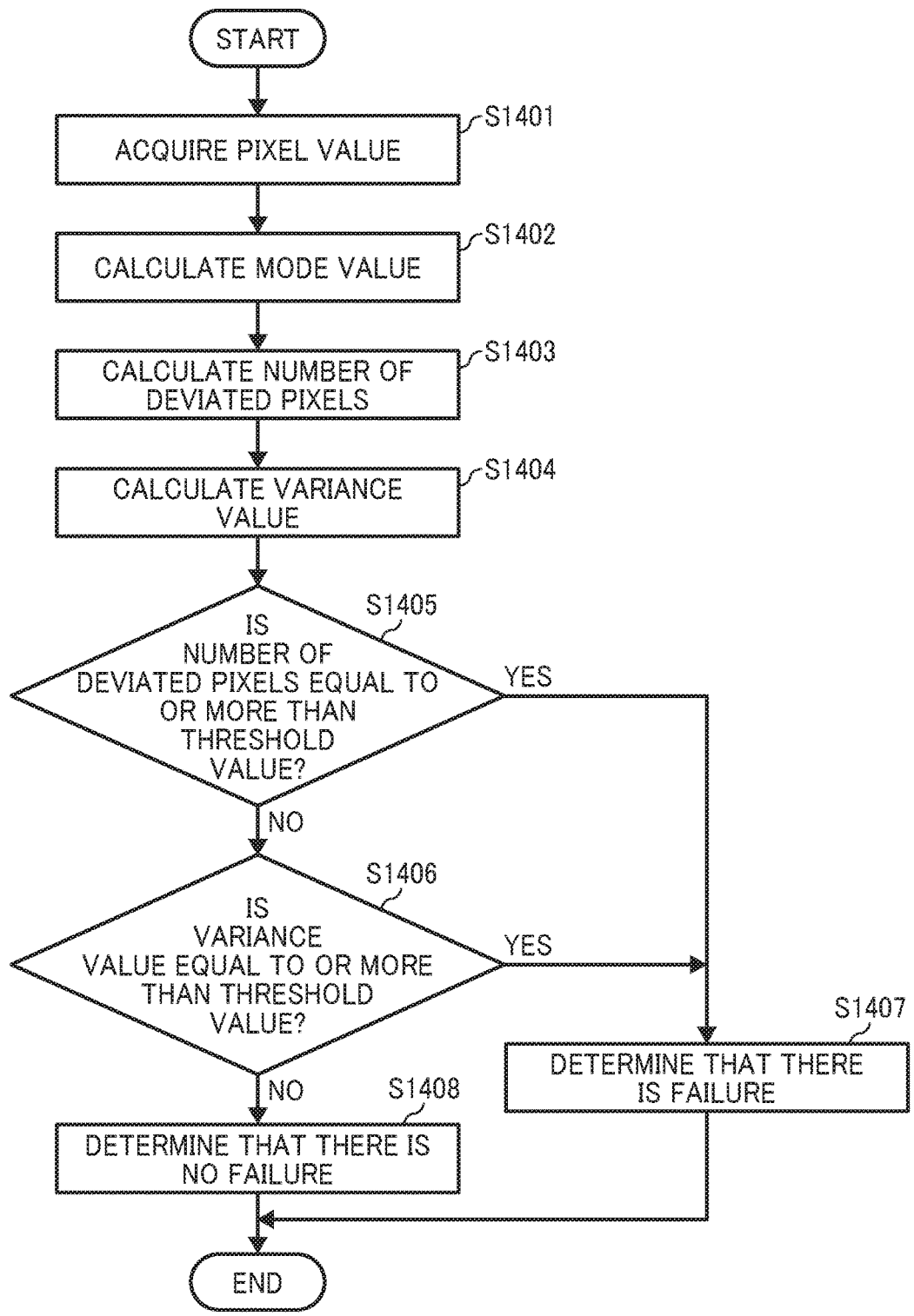
FIG. 14 is a flowchart illustrating a failure determination operation performed by the patch failure determination unit as an embodiment of the present invention.

Next, a functional configuration of the patch failure determination unit 456 in this embodiment is described below. FIG. 13 is a block diagram illustrating a functional configuration of the patch failure determination unit 456 in this embodiment. FIG. 14 is a flowchart illustrating a failure determination operation performed by the patch failure determination unit 456 in this embodiment.

As shown in FIG. 13, the patch failure determination unit 456 in this embodiment includes a pixel value acquisition unit 461, a mode value calculator 462, a number of deviated pixels counter 463, a variance value calculator 464, and a failure determination unit 465. The operation of determining a failure performed by the patch failure determination unit 456 in this embodiment is described below with reference to FIG. 14. The failure determination operation described below is performed for each color patch included in the color chart. In addition, the failure determination operation is performed on each channel of RGB that constructs the color patch. If it is determined that at least any one of the channels includes a failure, it is determined that the color patch has a failure.

Figure 15A:
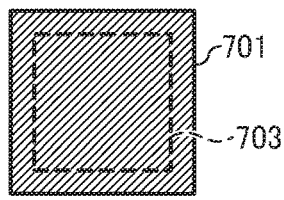
FIGS. 15A and 15B are diagrams illustrating a distribution of pixel values of a clean color patch as an embodiment of the present invention.
Figure 15B:
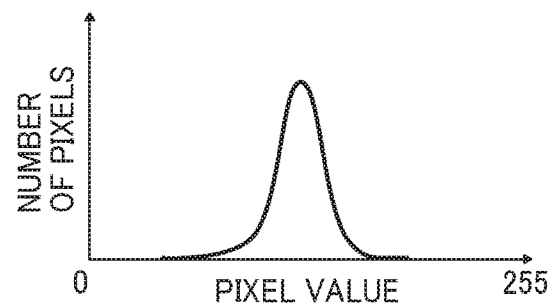
Figure 16A:
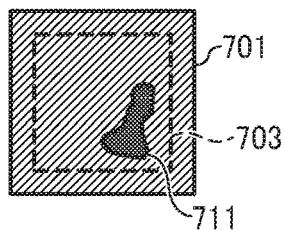
FIGS. 16A and 16B are diagrams illustrating a distribution of pixel values of a dirty color patch as an embodiment of the present invention.
Figure 16B:
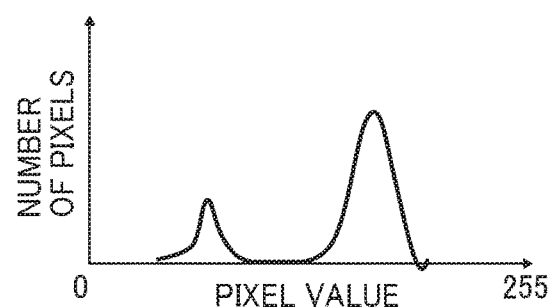
Figure 17A:
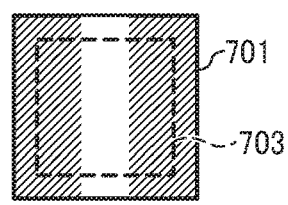
FIGS. 17A and 17B are diagrams illustrating a distribution of pixel values of a color patch including a streaky failure as an embodiment of the present invention.
Figure 17B:
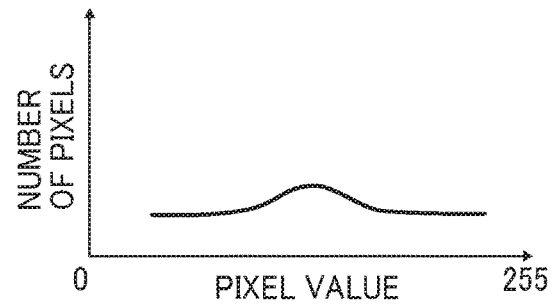

First, before describing the failure determination operation by the patch failure determination unit 456, distribution of pixel values for each pixel that constructs the color patch 701 for each status of the color patch 701 is described below. FIGS. 15A and 15B are diagrams illustrating a distribution of pixel values of the clean color patch 701 in this embodiment. FIGS. 16A and 16B are diagrams illustrating a distribution of pixel values of the color patch 701 including taint 711 in this embodiment. FIGS. 17A and 17B are diagrams illustrating a distribution of pixel values of the color patch 701 including a streaky failure in this embodiment.

In FIGS. 15B, 16B, and 17B, a horizontal axis indicates pixel values (in 8 bits, i.e., 0 to 255), and a vertical axis indicates the number of pixels. The relationship between the pixel values and the number of pixels illustrated in FIGS. 15B, 16B, and 17B is an example and varies in accordance with the color of the color patch.

As shown in FIG. 15A, since the color of the clean color patch 701 is uniform, distribution of pixel values is contained within a predetermined area with a focus on the pixel value of the mode value as a peak as shown in FIG. 15B. By contrast, as shown in FIG. 16A, the color of the color patch 701 with taint 711 is not uniform, and another peak appears in the distribution of pixel values other than the mode value as shown in FIG. 16B.

Distribution of pixel values of the color patch 701 including a streaky failure shown in FIG. 17A is almost uniform while there is the mode value as shown in FIG. 17B. Therefore, it is highly possible that a colorimetric value of the color patch 701 is not an intended one.

Based on the distribution of pixel values that construct the scanned image of each color patch, the patch failure determination unit 456 in this embodiment determines a failure in the scanned image as described below. As shown in FIG. 14, in the patch failure determination unit 456, the pixel value acquisition unit 461 acquires pixel values of pixels included in an area of each color patch in the scanned image to be performed colorimetry from the scanned image colorimeter 455 in S1401.

The mode value calculator 462 calculates a mode value from the pixel values of pixels acquired by the pixel value acquisition unit 461 in S1402. The number of deviated pixels counter 463 counts the number of deviated pixels a predetermined value (e.g., equal to or more than ±20) away from the mode value calculated by the mode value calculator 462 (hereinafter referred to as "the number of deviated pixels") in S1403. On the other hand, the variance value calculator 464 calculates a distribution value of the color patch from the pixel values of pixels acquired by the pixel value acquisition unit 461 in S1404.

As described above, the mode calculator 462, the number of deviated pixels counter 463, and the variance value calculator 464 calculate profile information of pixel values indicating a profile status of pixel values that construct the scanned image of the color patches shown in FIGS. 15A to 17A. That is, the mode calculator 462, the number of deviated pixels counter 463, and the variance value calculator 464 function as a pixel value distribution information calculator that calculates pixel value distribution information indicating a profile status of pixel values that construct the scanned image of the color patch.

The failure determination unit 465 determines whether or not the number of deviated pixels counted by the number of deviated pixels counter 463 is equal to or more than a predetermined threshold value (hereinafter referred to as "the number of deviated pixels threshold value") in S1405. If the number of deviated pixels is equal to or more than the number of deviated pixels threshold value (YES in S1405), the failure determination unit 465 determines that the color patch includes a failure such as taint in S1407, and the process ends. For example, if there is another peak at a pixel value equal to or more than a predetermined value away from the mode value just like the distribution of pixel values shown in FIG. 16B, the number of deviated pixels become equal to or more than the number of deviated pixels threshold value.

By contrast, if the number of deviated pixels is less than the number of deviated pixels threshold value (NO in S1405), the failure determination unit 465 determines whether or not the variance value calculated by the variance value calculator 464 is equal to or more than a predetermined threshold value (hereinafter referred to as "variance value threshold") in S1406. If the variance value is equal to or more than the variance value threshold (YES in S1406), the failure determination unit 465 determines that the color patch has a failure such as a streak in S1407, and the process ends. For example, if the distribution of pixel values is almost uniform as shown in FIG. 17B, the variance value becomes equal to or more than the variance value threshold.

If the variance value is less than the variance value threshold (NO in S1406), the failure determination unit 465 determines that the color patch has no failure in S1408, and the process ends. For example, if there is only one peak at the mode value and pixel values range within a predetermined range with a central focus on the mode value, the number of deviated pixels is less than the number of deviated pixels threshold value and the variance value is less than the variance value threshold.

Since the operation in S1401 to S1403 and the operation in S1404 are context-free, it is possible to perform them in reverse order, or it is possible to perform them concurrently. In addition, since the operation in S1405 and the operation in S1406 are context-free, it is possible to perform them in reverse order.

In the embodiment described above, it is determined whether or not the color patch has a failure based on the number of deviated pixels of pixel values of the color patch away from the mode value and the variance value of pixel values of the color patch. However, in case of determining a specific failure only in the color patch etc., it is possible to determine whether or not the color patch has a failure based on either the number of deviated pixels away from the mode value or the variance value only. In addition, degree of variance of pixel values is not the variance value but another statistics value that can express degree of variation of pixel values that construct the scanned image such as standard deviation.

As described above, based on the variance status of pixel values that construct the scanned image of the color patch, the table generator 405 in this embodiment determines whether or not the scanned image has a failure and generates the color conversion table if it is determined that there is no failure. In the embodiment described above, it is possible to determine whether or not the color patch has taint or a failure such as streak by using a single color patch laid out on the color chart, and it is possible to determine whether or not the color patch is printed accurately or colorimetry is performed accurately.

In addition, the table generator 405 in this embodiment that functions as a color processor can be applied to not only the image inspection system in this embodiment but also other apparatuses that uses the color conversion table. An example of the other apparatuses is a printer that uses a color conversion table in performing calibration to achieve same output colors always against input colors reducing color fluctuation due to idiosyncrasy among apparatuses and environment.

It should be noted that colorimetry of the color patch in this embodiment is performed by using the scanner 400. However, that is just an example, and it is possible to use other colorimeters such as a portable colorimeter as long as it can perform colorimetry on the color patch in units of pixel. In addition, the color space in the embodiment described above is conversion from CMYK to RGB. However, in accordance with apparatuses that use the color conversion table, it is possible to use other color spaces such as conversion from CMYK to CMYK or conversion from Lab to RGB etc.

In the embodiment described above, regardless of color density of the color patch, pixel values equal to or more than the predetermined value (e.g., ±20 pixels) away from the mode value are considered as the deviated values. Other than that, it is possible to modify the predetermined value away from the mode value in accordance with the color density of the color patch. For example, as the color density of the color patch is darker, the smaller predetermined value is configured since they are close to the color of taint.

In the embodiment described above, if the patch failure determination unit 456 determines that the scanned image of the color patch has a failure, the patch failure determination unit requests the inspection controller 403 to reprint. Other than that, it is possible not to request to reprint in accordance with content determined that the scanned image has a failure but to recalculate colorimetric value of the scanned image excluding pixels that includes the failure from the scanned image of the color patch.

Figure 18:
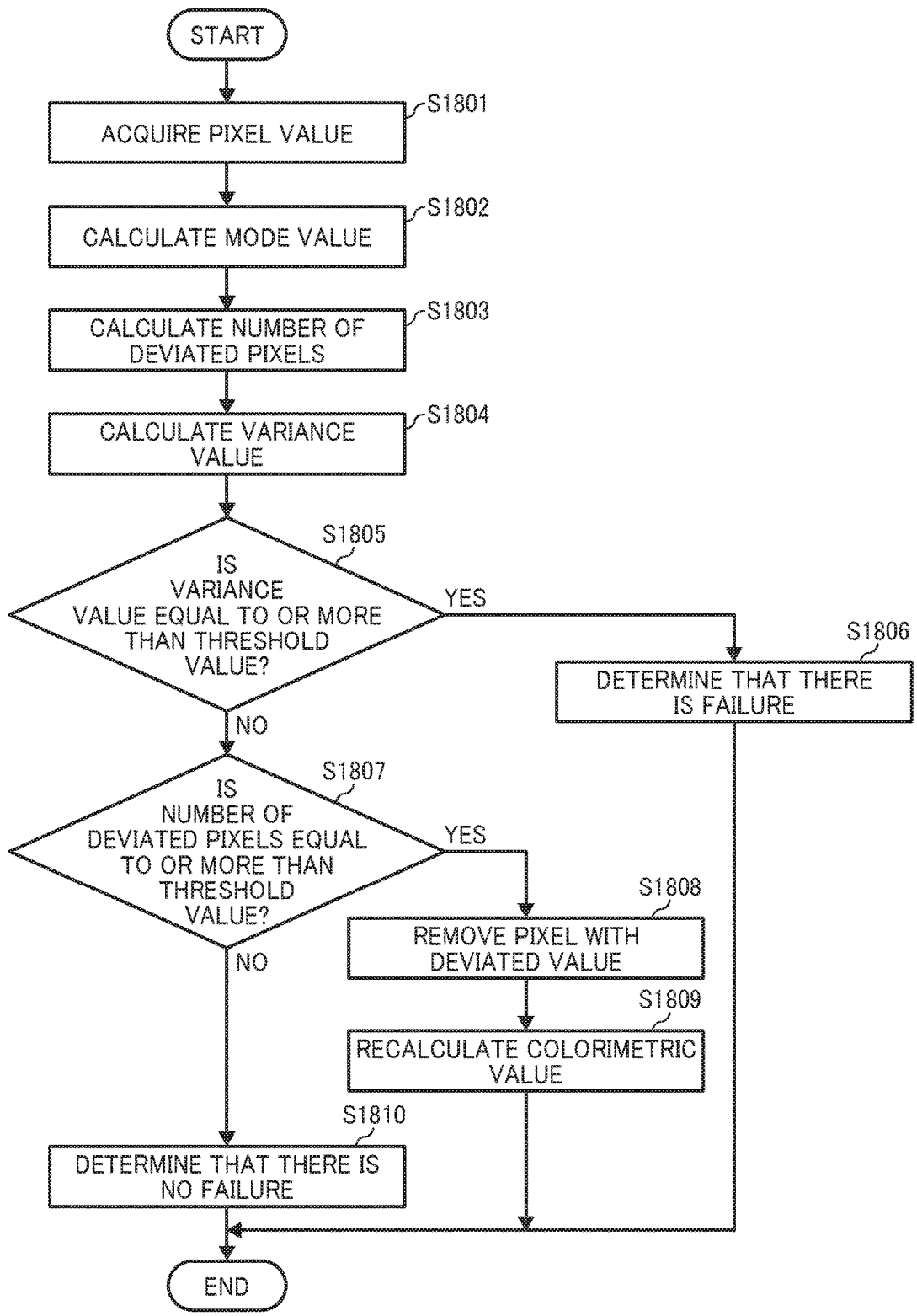
FIG. 18 is a flowchart illustrating another failure determination operation performed by the patch failure determination unit as an embodiment of the present invention.

FIG. 18 is a flowchart illustrating another failure determination operation performed by the patch failure determination unit 456 that recalculates the colorimetric value in this embodiment. The operation in S1801 to S1804 in FIG. 18 is similar to the operation in S1401 to S1404 in FIG. 14. After that, first, the failure determination unit 465 determines whether or not the variation value calculated by the variance value calculator 464 is equal to or more than the variance value threshold in S1805.

If the variance value is equal to or more than the variance value threshold (YES in S1805), just like the operation in S1407 in FIG. 14, the failure determination unit 465 determines that the color patch has a failure such as a streak in S1806, and the process ends. By contrast, if the variance value is less than the variance value threshold (NO in S1805), the failure determination unit 465 determines whether or not the number of deviated pixels is equal to or more than the number of deviated pixels threshold value in S1807. If the number of deviated pixels is equal to or more than the number of deviated pixels threshold (YES in S1807), in S1808, the failure determination unit 465 excludes pixels with deviated values from pixel values that construct the color patch acquired by the pixel value acquisition unit 461 in S1801.

Subsequently, the failure determination unit 465 outputs the scanned image of the color patch from which the pixels with deviated values are excluded to the scanned image colorimeter 455 to instruct to recalculate the colorimetric value using the scanned image of the color patch excluding the pixels with deviated values in S1809. As a result, the scanned image colorimeter 455 performs colorimetry on the scanned image from which the pixels with deviated values (e.g., pixels of the taint 711 shown in FIG. 16A) is excluded. By contrast, if the number of deviated pixels is less than the number of deviated pixels threshold value, the failure determination unit 465 determines that the color patch has no failure in S1810, and the process ends.

By using the configuration described above, if it is determined that the number of deviated pixels is equal to or more than the number of deviated pixels threshold value and the scanned image of the color patch has a failure, the color conversion table is generated based on the colorimetric value of the scanned image from which the pixels with deviated values are excluded. As a result, even if it is determined that the failure occurs, it is possible to generate the color conversion table based on the scanned image of the color patch without the failure instead of reprinting the color chart. If the variance value is equal to or more than the variance value threshold, since it is possible that pixel values that construct the color patch vary largely and it is possible that the colorimetry is not performed appropriately because the number of samples is not many even if the colorimetric value is recalculated using values other than deviated values, it is assumed that the similar operation shown in the case of FIG. 14 is performed.

In this embodiment, in case of excluding pixels with deviated values, the failure determination unit 465 can also exclude images around the pixels with deviated values (e.g., pixels 3 pixels around the pixels with deviated values). As a result, since pixel values under the influence of taint such as flare at scanning the sheet on which the color patch is printed are also excluded, it is possible to perform colorimetry on the scanned image more accurately.

In the embodiment described above, the failure determination unit 465 determines whether or not the color patch has a failure based on the number of pixels deviated from the mode value that construct the scanned image of the color patch. In this case, if a tainted area in the color patch is larger than a colored area of the color patch, the mode value becomes pixel value at the tainted part. To cope with this issue, in the description below, if there are multiple peaks in the variation of pixel values that construct the scanned image of the color patch, any one of the peaks is considered as a normal value, and pixels deviated from the normal value are excluded from pixel values that construct the color patch.

Figure 19:
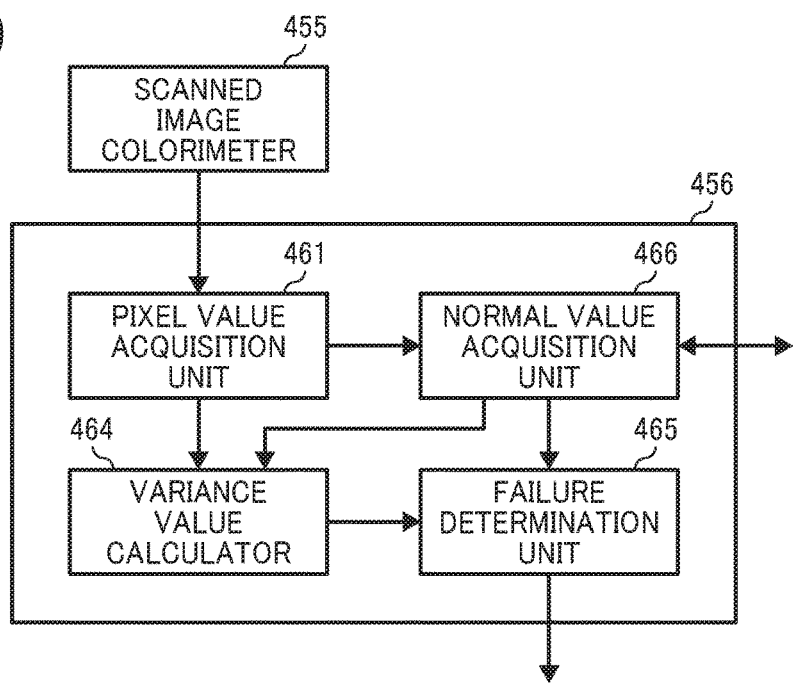
FIG. 19 is a block diagram illustrating another functional configuration of a patch failure determination unit as an embodiment of the present invention.
Figure 20:
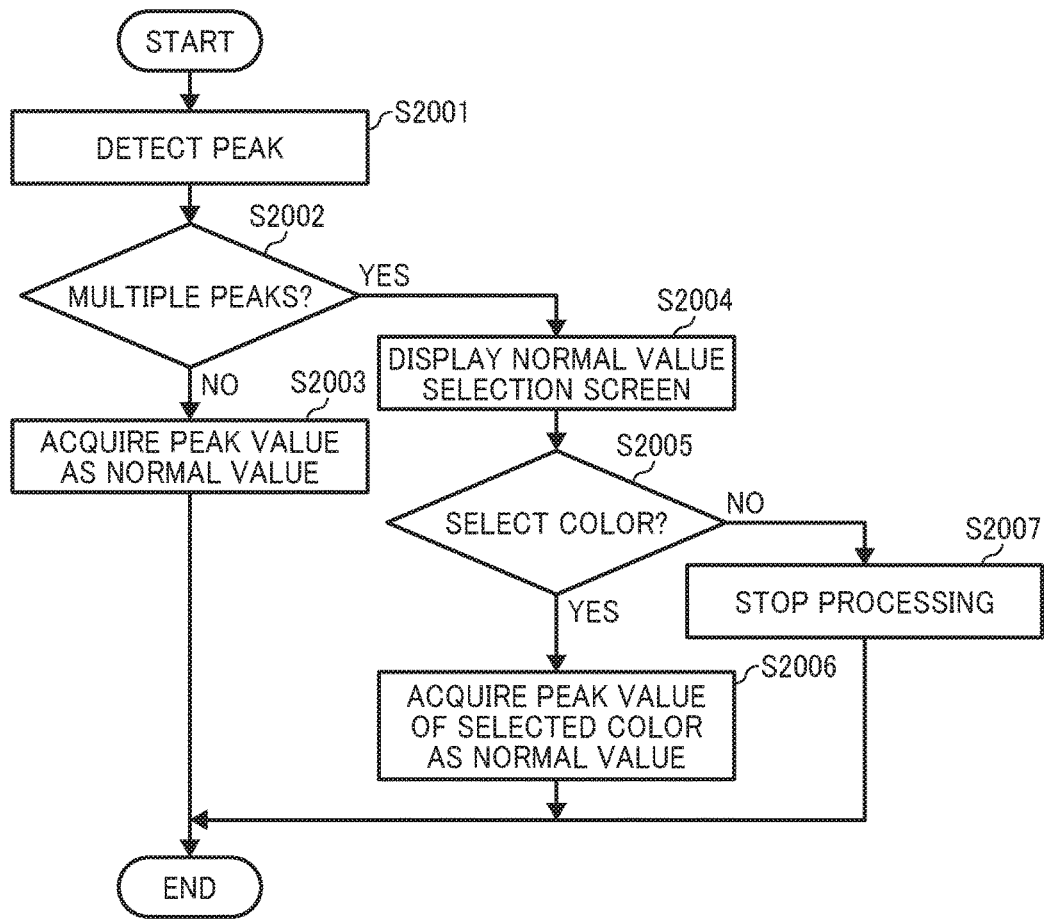
FIG. 20 is a flowchart illustrating an operation of acquiring a normal value performed by a normal value acquisition unit as an embodiment of the present invention.

FIG. 19 is a block diagram illustrating another functional configuration of the patch failure determination unit 456 in this embodiment. As shown in FIG. 19, in the patch failure determination unit 456, the mode value calculator 462 included in the patch failure determination unit 456 in FIG. 13 is replace with the normal value acquisition unit 466, and the number of deviated pixels counter 463 is deleted from the configuration in FIG. 13. FIG. 20 is a flowchart illustrating an operation of acquiring a normal value performed by the normal value acquisition unit 466 in this embodiment. In the below description, only configuration different from the configuration in FIG. 13 is described, and description for other configuration is omitted.

As shown in FIG. 20, the normal value acquisition unit 466 detects a peak (a local maximum) from pixel values that construct the scanned image of the color patch acquired by the pixel value acquisition unit 461 in S2001. That is, the normal value acquisition unit 466 functions as a pixel value variance information acquisition unit that acquires the local maximum of pixel values that construct the scanned image of the color patch as pixel value variance information indicating variance status of pixel values.

After detecting the peak, the normal value acquisition unit 466 determines whether or not the detected peaks are multiple in S2002. If it is determined that the number of peak is one (NO in S2002), the normal value acquisition unit 466 determines that the detected peak indicates the color of the color patch is uniform and the color patch has no failure and acquires the peak value as the normal value in S2003. In this case, the normal value acquisition unit 466 instructs the variation value calculator 464 to calculate the variation value, and the operation in S1404 and the operation after S1406 in FIG. 14 are performed by the variation value calculator 464 and the failure determination unit 465.

Figure 21:
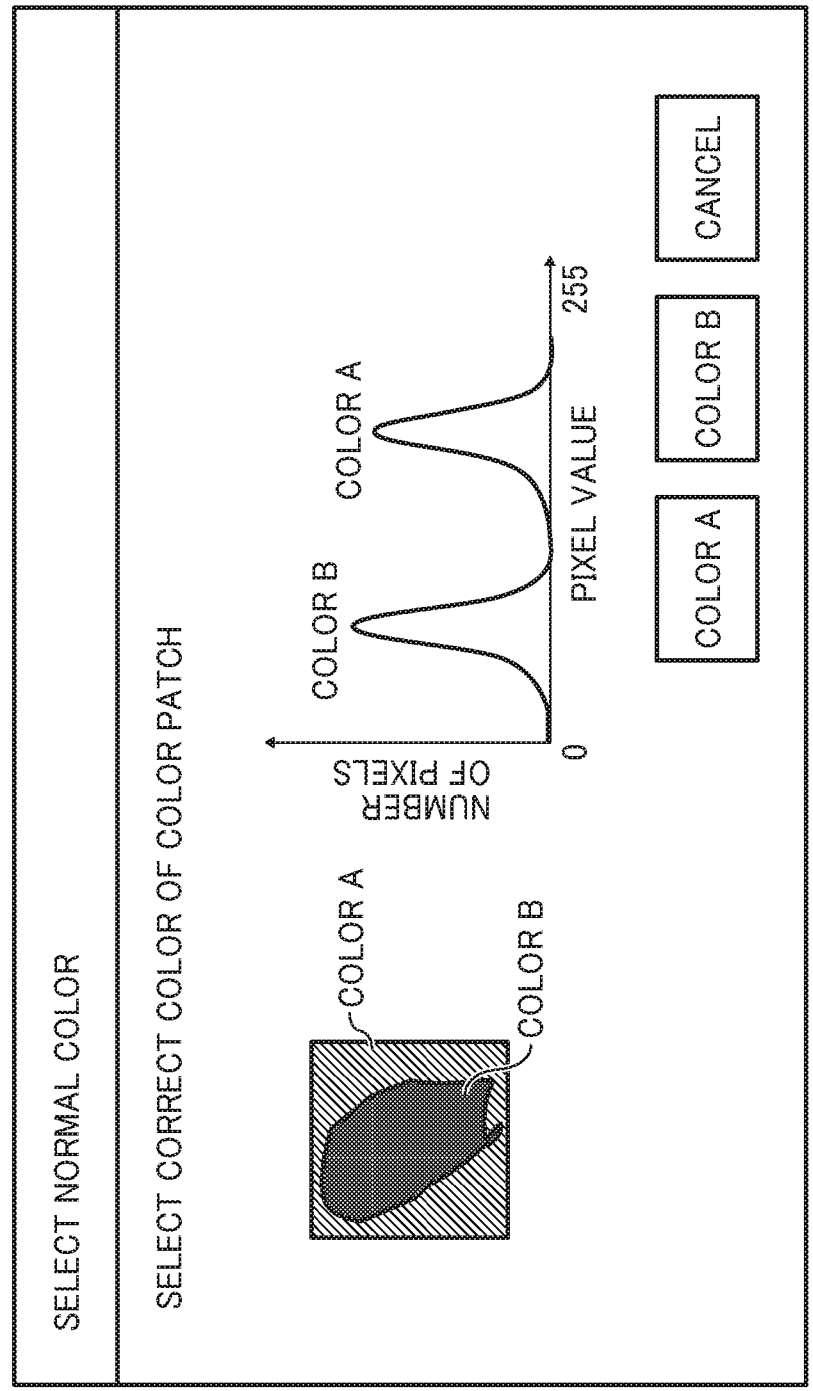
FIG. 21 is a diagram illustrating a screen of selecting a normal value as an embodiment of the present invention.

By contrast, if it is determined that there are multiple peaks (YES in S2002), for example, the normal value acquisition unit 466 controls so that the display unit in the interface terminal 5 displays a screen for select the normal value (hereinafter referred to as "normal value selection screen") in S2004. FIG. 21 is a diagram illustrating the normal value selection screen in this embodiment. As shown in FIG. 21, on the normal value selection screen, for example, an image of the color patch that the multiple peaks are detected, a graph indicating variation of pixel values that construct the image, and selection buttons are displayed.

In addition, the image of the color patch is labeled so that colors indicated by the multiple peaks (e.g., colors A and B) can be distinguished, and the labeled colors are associated with the peaks of the graph indicating the variation of pixel values. In FIG. 21, it is illustrated that the number of colors indicated by the peak values is two as an example. However, the number of colors indicated by the peak values is not limited to that.

With reference to the normal value selection screen shown in FIG. 21, one color button (e.g., "color A" and "color A" "button") considered as the normal value among labeled colors is pressed by user operation. In case of selecting no color as the normal value, "Cancel" button is pressed by user operation. If any one button displayed on the normal value selection screen is pressed by user operation, information indicating which button is pressed is reported to the normal value acquisition unit 466.

The normal value acquisition unit 466 determines which button is pressed among buttons displayed on the normal value selection screen in S2005. If it is determined that the color selection button is pressed (YES in S2005), the normal value acquisition unit 466 acquires the peak value of the selected color as the normal value in S2006. In this case, the normal value acquisition unit 466 outputs the acquired normal value to the failure determination unit 465 and instructs the failure determination unit 465 to exclude the pixels with deviated values. Just like the operation in S1808 in FIG. 18, the failure determination unit 465 excludes pixels with deviated values equal to or more than the predetermined value (e.g., ±20) away from the normal value and performs the operation after S1809.

By contrast, if it is determined that the Cancel button is pressed (NO in S2005), the normal value acquisition unit 466 instructs each unit in the table generator 405 to stop generating the color conversion table in S2007.

By using the configuration described above, even if the pixel value indicating taint in the color patch is the mode value, the patch failure determination unit 456 can determine the failure in the color patch accurately.

In the normal value acquisition operation shown in FIG. 20, for example, the normal value acquisition unit 466 acquires the peak value indicating the color selected by user operation as the normal value. Other than that, the normal value acquisition unit 466 can select the normal value with reference to a RIP image of the color patch.

Figure 22:
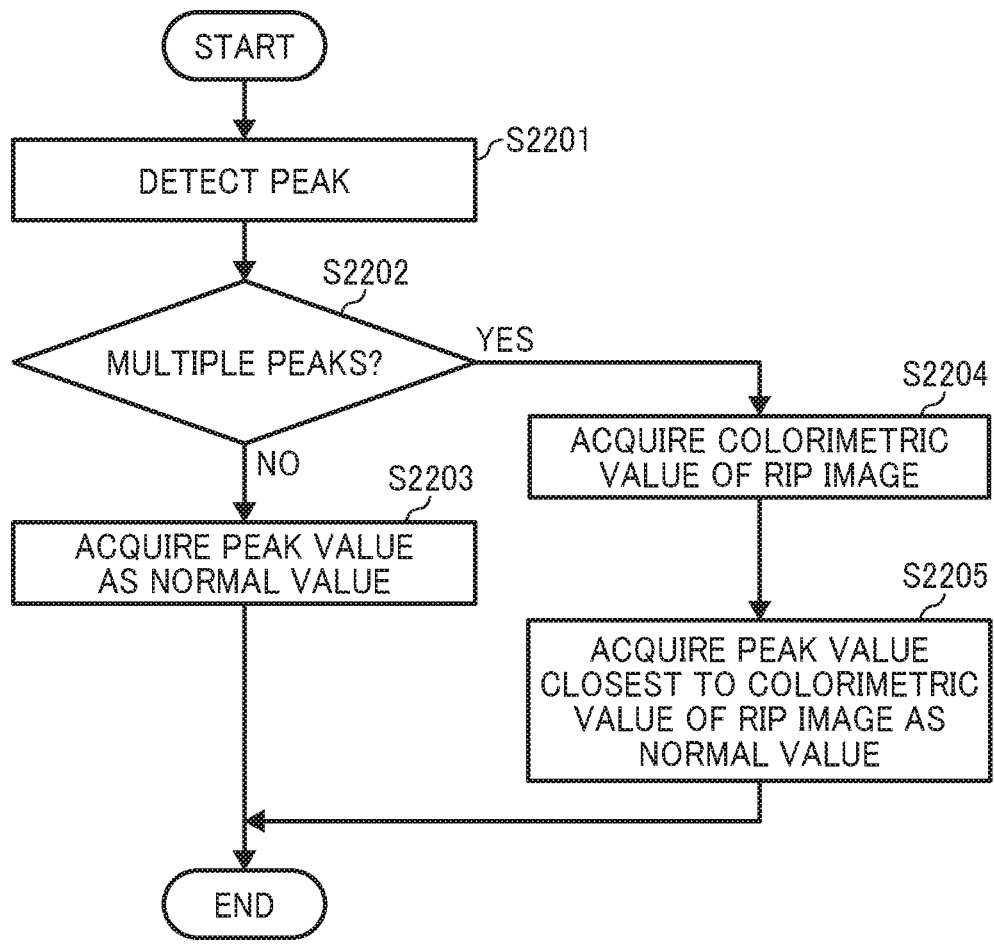
FIG. 22 is a flowchart illustrating another operation of acquiring a normal value performed by a normal value acquisition unit as an embodiment of the present invention.

FIG. 22 is a flowchart illustrating another operation of acquiring the normal value performed by the normal value acquisition unit 466 with reference to the RIP image of the color patch. As shown in FIG. 22, the operation in S2201 to S2203 is similar to the operation in S2001 to S2003 in FIG. 20. On the other hand, if it is determined that the multiple peaks are detected (YES in S2202), the normal value acquisition unit 466 acquires colorimetric value in the RIP image of the same color patch calculated by the RIP image colorimeter 453 in S2204.

After acquiring the colorimetric value of the RIP image, the normal value acquisition unit 466 acquires the peak value closest to the color indicated by the acquired colorimetric value of the RIP image as the normal value and outputs it to the number of deviated pixels counter 463 in S2205. While reproducible color range is different between the RIP image and the scanned image, since color ranges reproduced by the same color patch are close with each other, with reference to the colorimetric value of the RIP image, the normal value acquisition unit 466 can acquire the normal value accurately.

By using the configuration described above, instead of selecting the normal value by user operation, it is possible to select an appropriate normal value among multiple peak values.

It is possible to combine the embodiment that acquires the normal value based on the colorimetric value of the RIP image with the embodiment that acquires the normal value base on the selection information via the normal value selection screen described above. In this case, for example, in the normal value selection screen shown in FIG. 21, a peak value closest to the color indicated by the colorimetric value of the RIP image and other peak values are displayed distinguishably with each other. By using the configuration described above, it is possible to guide in selecting the normal value via the normal value selection screen by user operation, and it is possible to select the normal value by user operation more easily.

For example, if there are multiple peak values relatively close to the color indicated by the colorimetric value of the RIP image, it is possible to display these peak values on the normal value selection screen and select one of the peak values by user operation. By using the configuration described above, since the number of candidate peak values displayed on the normal value selection screen is limited, it is possible to select the normal value by user operation more easily.

If the color indicated by the colorimetric value of the RIP image is away from the color with peak value closest to the color indicated by the colorimetric value of the RIP image more than predetermined color gamut, it is possible not to consider the peak value as the normal value, to select the normal value selection screen, or to stop performing operation after that. By using the configuration described above, it is possible to prevent from acquiring an incorrect peak value as the normal value.

In the embodiment described above, for example, if multiple peaks are detected from pixel values that construct the scanned image of the color patch, any one of the peak values is acquired as the normal value. Other than that, if multiple peaks are detected, color of the color patch is not uniform. Therefore, it is possible to determine that a failure is included in that case.

The present invention also encompasses a non-transitory recording medium storing a program that executes a color processing method. The color processing method includes the steps of obtaining a color patch scanned image acquired by scanning a color patch, acquiring a pixel value of the color patch scanned image, calculating pixel value variance information indicating a variance of the pixel values based on the acquired pixel values, and determining whether or not the color patch scanned image is defective based on the pixel value variance information.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

In the above-described example embodiment, a computer can be used with a computer-readable program, described by object-oriented programming languages such as C++, C#, Java (registered trademark), or legacy programming languages such as machine language, assembler language, C language to control functional units used for the apparatus or system. The computer software can be provided to the programmable device using any storage medium or carrier medium for storing processor-readable code such as a floppy disk, a compact disk read only memory (CD-ROM), a digital versatile disk read only memory (DVD-ROM), DVD recording only/rewritable (DVD-R/RW), Blu-ray disc, electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these. A part of the functions of the described embodiments or all functions of the described embodiments may be implemented by one or more processing circuits. A processing circuit includes a programmed processor, as a processor includes circuitry. A processing circuit includes a programmable device (PD) such as a Field Programmable Gate Array (FPGA) for example. A processing circuit also includes devices such as an application specific integrated circuit (ASIC) and conventional circuit components arranged to perform the recited functions. It is also possible to distribute them storing a recording medium as data described in circuit configuration data (bit stream data) downloaded to the PD to implement the functional blocks on the PD, Hardware Description Language (HDL) for generating the circuit configuration data, Very High speed integrated circuits hardware Description Language (VHDL), and Verilog-HDL etc.

Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

What is claimed is:

1. A color processing apparatus, comprising circuitry to:
   acquire bitmap data of a color chart for generating a color conversion table, the color chart having a grid of color patches that gradate a color, each color patch being uniform in color value;
   acquire first colorimetric values for each color patch in the color chart of the bitmap data;
   obtain a scanned image of the color patch by scanning a printed output of the color patch;
   acquire second colorimetric values for each color patch in the color chart of the scanned image;
   analyze each color patch in the color chart of the scanned image to determine a distribution of pixel values in each color patch;
   determine whether or not the color chart of the scanned image is defective based on the distribution of pixel values in each color patch in the color chart; and
   in response to a determination that the color chart is not defective, generate the color conversion table based on the color chart by associating the first colorimetric values with the second colorimetric values.

2. The color processing apparatus according to claim 1, wherein the circuitry calculates a mode of pixel values for each color patch in the scanned image, and
   for each color patch in the scanned image, determines a number of deviated pixels from the mode, a deviated pixel having a pixel value deviated from the mode in at least a predetermined value, and determines that the color chart is defective based on a determination that the number of deviated pixels of at least one color patch is equal to or more than a predetermined threshold value.

3. The color processing apparatus according to claim 2, wherein the circuitry excludes the deviated pixels from the color chart of the scanned image, reacquires the second colorimetric values for the scanned image based on the deviated pixels excluded from the color chart, and generates the color conversion table by associating the first colorimetric values with the second colorimetric values reacquired based on the deviated pixels excluded from the color chart.

4. The color processing apparatus according to claim 1, wherein the circuitry analyzes each color patch in the color chart of the scanned image to detect multiple concentrations of pixel values in at least one color patch, further selects one of the multiple concentrations of pixel values as a normal value, excludes deviated pixels from the color chart of the scanned image based on the normal value selected, reacquires the second colorimetric values for the scanned image based on the deviated pixels excluded from the color chart, and generates the color conversion table by associating the first colorimetric values with the second colorimetric values reacquired based on the deviated pixels excluded from the color chart.

5. An inspection system comprising the color processing apparatus of claim 1.

6. An inspection apparatus comprising:
   a memory to store bitmap data of a color chart for generating a color conversion table, the color chart having a grid of color patches that gradate a color, each color patch being uniform in color value; and
   circuitry to:
      acquire first colorimetric values for each color patch in the color chart of the bitmap data;

obtain a scanned image of the color patch by scanning a printed output of the color patch;
acquire second colorimetric values for each color patch in the color chart of the scanned image;
analyze each color patch in the color chart of the scanned image to determine a distribution of pixel values in each color patch;
determine whether or not the color chart is defective based on the distribution of pixel values in each color patch; and
in response to a determination that the color chart is not defective, generate the color conversion table based on the color chart by associating the first colorimetric values with the second colorimetric values.

7. The inspection apparatus of claim 6, wherein the circuitry is further configured to:
acquire a scanned image to be inspected, the scanned image being generated by scanning an image to be inspected that is output on a recording medium;
generate an inspection image for inspecting the scanned image to be inspected by converting color space of the image to be inspected based on the color conversion table; and
inspect whether or not the scanned image to be inspected is defective based on a difference image indicating a difference between the acquired scanned image to be inspected and the generated image to be inspected.

8. A method comprising:
acquiring bitmap data of a color chart for generating a color conversion table, the color chart having a grid of color patches that gradate a color, each color patch being uniform in color value;
acquiring first colorimetric values for each color patch in the color chart of the bitmap data;
obtaining a scanned image of the color patch by scanning a printed output of the color patch;
acquiring second colorimetric values for each color patch in the color chart of the scanned image;
analyzing each color patch in the color chart of the scanned image to determine a distribution of pixel values in each color patch;
determining whether or not the color chart is defective based on the distribution of pixel values in each color patch; and
responsive to a determination that the scanned image is not defective, generating the color conversion table based on the color chart by associating the first colorimetric values with the second colorimetric values.

* * * * *